United States Patent [19]

Roach et al.

[11] Patent Number: 4,835,877
[45] Date of Patent: Jun. 6, 1989

[54] TRY SQUARE PROTRACTOR

[76] Inventors: Daniel Roach, 1230 St Lawrence Ave., Bronx, N.Y. 10472; George Spector, 233 Broadway RM 3815, New York, N.Y. 10007

[21] Appl. No.: 252,384

[22] Filed: Sep. 30, 1988

[51] Int. Cl.[4] .............................................. B43L 7/06
[52] U.S. Cl. ........................................ 33/426; 33/424; 33/419; 33/428
[58] Field of Search ................ 33/418, 419, 421, 424, 33/425, 426, 427, 420, 428

[56] References Cited

U.S. PATENT DOCUMENTS

| Re. 12,119 | 6/1903 | Oehrle | 33/419 |
|---|---|---|---|
| 798,695 | 9/1905 | Oehrle | 33/419 |
| 813,173 | 2/1906 | Realing | 33/419 |
| 842,806 | 1/1907 | McCausland | 33/419 |
| 1,255,158 | 2/1918 | Gronager | 33/419 |
| 1,523,265 | 1/1925 | Hobbs | 33/418 |
| 2,113,524 | 4/1938 | Wolfe | 33/419 |
| 2,308,373 | 1/1943 | Keegan | 33/419 |
| 2,316,189 | 4/1943 | Schaefer | 33/418 |
| 2,495,841 | 1/1950 | Fink | 33/426 |
| 2,579,768 | 12/1951 | Tefft | 33/424 |

*Primary Examiner*—William A. Cuchlinski, Jr.
*Assistant Examiner*—Thomas B. Will

[57] ABSTRACT

A combined try square and protractor is structured to measure a right angle, to measure center of a pipe and to measure various angles therefrom.

5 Claims, 1 Drawing Sheet

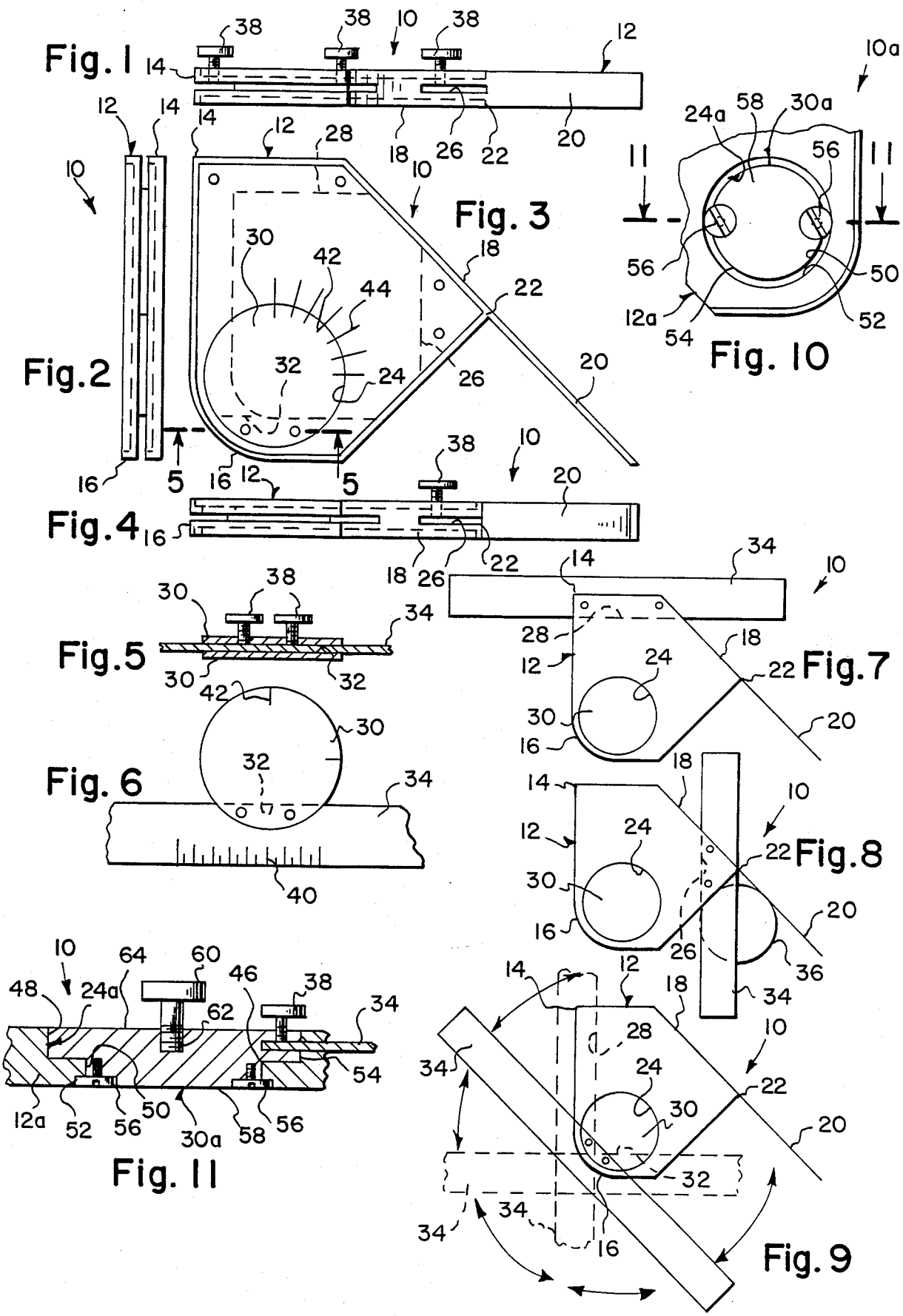

TRY SQUARE PROTRACTOR

BACKGROUND OF THE INVENTION

The instant invention relates generally to protractor devices and more specifically it relates to a combined try square and protractor.

Numerous protractor devices have been provided in prior art that are adapted to measure angles. For example, U.S. Pat. Nos. 843,459; 932,907; 935,860; 840,439; 1,161,761; 1,161,961; 1,491,048; 1,524,703 and 1,823,931 all are illustrative of such prior art. While these units may be suitable for the particular purpose to which they address, they would not be as suitable for the purposes of the present invention as heretofore described.

SUMMARY OF THE INVENTION

A primary object of the present invention is to provide a combined try square and protractor that will overcome the shortcomings of the prior art devices.

Another object is to provide a combined try square and protractor which is a versatile tool that can be used to measure right angles, to measure center of a pipe and measure various angles.

An additional object is to provide a combined try square and protractor that is fabricated out of durable material so that it will last a long period of time.

A further object is to provide a combined try square and protractor that is simple and easy to use.

A still further object is to provide a combined try square and protractor that is economical in cost to manufacture.

Further objects of the invention will appear as the description proceeds.

To the accomplishment of the above and related objects, this invention may be embodied in the form illustrated in the accompanying drawings, attention being called to the fact, however that the drawings are illustrative only, and that changes may be made in the specific construction illustrated and described within the scope of the appended claims.

BRIEF DESCRIPTION OF THE DRAWING FIGURES

FIG. 1 is a rear view of the invention.

FIG. 2 is a side view thereof.

FIG. 3 is a top view thereof.

FIG. 4 is a front view thereof.

FIG. 5 is a cross sectional view taken along line 5—5 in FIG. 3.

FIG. 6 is a top view of the protractor dial in engagement with the blade.

FIG. 7 is a diagrammatic top view of the invention being used for marking lines at right angles.

FIG. 8 is a diagrammatic top view of the invention being used to measure center of a pipe.

FIG. 9 is a diagrammatic top view of the invention being used to measure various angles.

FIG. 10 is a bottom view with parts broken away of a modification in which set screws hold the protractor dial within an annular recess of the housing.

FIG. 11 is a cross sectional view taken along line 11—11 in FIG. 10 showing a central knob thereon to turn the protractor dial thereabout.

DETAILED DESCRIPTION OF THE PREFERRED EMBODIMENTS

Turning now descriptively to the drawings, in which similar reference characters denote similar elements throughout the several views, FIGS. 1 through 9 illustrate a combined try square and protractor 10 consisting of a home plate shaped housing 12 that includes a square corner 14, a curved corner 16, an opposite diamond shaped side 18 in a 45° angle and a guide arm 20 extending downwardly at a 45° angle from tip 22 of the diamond shaped side 18. The housing 12 has an aperture 24 therethrough at the curved corner 16, a first edge slot 26 extending inwardly through the tip 22 of the diamond shaped side 18 and a second C-shaped slot 28 extending inwardly through the square corner 14 and the curved corner 16. A protractor dial 30 is carried in the aperture 24 in the housing 12 in which the protractor dial 30 has an edge slot 32 therein. A blade 34 is removably attached within the second C-shaped slot 28 to the housing 12 at the square corner 14 so as to measure right angles therefrom (see FIG. 7). The blade 34 is removably attached within the first edge slot 26, to the housing 12 at the tip 22 of the diamond shaped side 18 so as to measure center of a pipe 36 when the pipe is placed betweem the guide arm 20 and the diamond shaped side 18 (see FIG. 8). The blade 34 is removably attached within the slot 32 of the protractor dial 30 so as to measure various angles from the curved corner 16 of the housing 12 (see FIG. 9).

Retaining screws 38 are provided for removably attaching the blade 34 to the housing 12 and the protractor dial 30. The retaining screws 38 can be flush with top surface of the housing 12 so that the housing can be turned over and used in that position. The blade 34 has a scale 40 thereon to aid in measuring. The protractor dial 30 has a scale 42 thereabout while the housing 12 has a scale 44 about the aperture 24 to aid in measuring angles.

FIGS. 10 and 11 show a modified combined try square and protractor 10a in which the aperture 24a in the housing 12a has a stepped annular wall 46 therein so that front portion 48 of the aperture 24a is larger than rear portion 50, while the rear portion has an annular groove 52 thereabout. The protractor dial 30a has a stepped annular edge 54 so as to fit within the aperture 24a. A pair of set screws 56 thread into rear 58 of the protractor dial 30a and ride flush within the annular groove 52 so as to rotatably secure the protractor dial 30a within the aperture 24a. A knob 60 is attached at 62 to center of front surface 64 of the protractor dial 30a so as to aid in turning the protractor dial for angular settings thereof, or dial 30a can be turned manually without knob 60.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A combined try square and protractor which comprises:

(a) a home plate shaped housing that includes a square corner, a curved corner, an opposite diamond shaped side in a 45° angle and a guide arm extending downwardly at a 45° angle from tip of said diamond shaped side, said housing having an aperture therethrough at said curved corner, a first edge slot extending inwardly through said tip of said diamond shaped side and a second C-shaped slot extending inwardly through said square corner and said curved corner;

(b) a protractor dial carried in said aperture in said housing, said protractor dial having an edge slot therein; and (c) a blade removably attached within said second C-shaped slot to said housing at said square corner so as to measure right angles therefrom, said blade removably attached within said first edge slot to said housing at said tip of said diamond shaped side so as to measure center of a pipe when the pipe is placed between said guide arm and said diamond shaped side and said blade removably attached within said slot of said protractor dial so as to measure various angles from said curved corner of said housing.

2. A combined try square and protractor as recited in claim 1, further comprising a plurality of retaining screws for removably attaching said blade to said housing and said protractor dial.

3. A combined try square and protractor as recited in claim 2, further including:

(a) said blade having a scale thereon to aid in measuring;

(b) said protractor dial having a scale thereabout; and (c) said housing having a scale about said aperture to aid in measuring angles.

4. A combined try square and protractor as recited in claim 3, further including:

(a) said aperture in said housing having a stepped annular wall therein so that front portion of said aperture is larger than rear portion, said rear portion having an annular groove thereabout;

(b) said protractor dial having a stepped annular edge so as to fit within said aperture; and (c) a pair of set screws to thread into rear of said protractor dial and ride flush within said annular groove so as to rotatably secure said protractor dial within said aperture.

5. A combined try square and protractor as recited in claim 4, further including a knob attached to center of front surface of said protractor dial so as to aid in turning said protractor dial for angular settings thereof.

* * * * *